United States Patent [19]

Taguchi

[11] 4,453,907

[45] Jun. 12, 1984

[54] VARIABLE-TYPE BUBBLE WATER COOLING APPARATUS

[75] Inventor: Takeo Taguchi, Tokyo, Japan

[73] Assignee: Tomi Machinery Manufacturing Co., Ltd., Yokohama, Japan

[21] Appl. No.: 486,792

[22] Filed: Apr. 20, 1983

[30] Foreign Application Priority Data

Mar. 1, 1983 [JP] Japan .............................. 58-28091[U]

[51] Int. Cl.³ ............................................ A01J 21/00
[52] U.S. Cl. .................. 425/326.1; 264/566; 425/72 R
[58] Field of Search ...................... 264/557, 566, 569; 425/71, 72 R, 326.1

[56] References Cited

U.S. PATENT DOCUMENTS

| | | | |
|---|---|---|---|
| 3,568,252 | 3/1971 | Masuda et al. | 425/326.1 |
| 3,576,929 | 4/1971 | Turner et al. | 425/71 |
| 3,659,984 | 5/1972 | Krstolic | 425/72 R |
| 3,778,205 | 12/1973 | Turner et al. | 425/71 |
| 3,958,913 | 5/1976 | Stangl | 425/72 R |

Primary Examiner—Donald E. Czaja
Assistant Examiner—W. Thompson
Attorney, Agent, or Firm—Roy F. Hollander

[57] ABSTRACT

The upper and lower ends of numbers of curved cooling pipes are rotatably supported in the variable-type bubble water cooling apparatus according to the present invention. The cooling water is supplied to the pipes. The diameter of enveloping circle formed by these curved cooling pipes at a determined horizontal position is varied by relatively rotating the upper and lower support members of pipes. Thus, as the diameter of bubble passing portion of the apparatus can freely be varied, bubbles of variety of sizes can be produced by a single apparatus. Also, the cooling effects and positions are constant and the produced bubble has no unevenness of its thickness.

1 Claim, 6 Drawing Figures

VARIABLE-TYPE BUBBLE WATER COOLING APPARATUS

BACKGROUND OF THE INVENTION

A. Field of the Invention

The present invention relates generally to an apparatus for cooling a cylindrical film in producing a thermoelastic resin film by inflation method, or more precisely, the variable-type bubble water cooling apparatus by which the upper and lower ends of numbers of curved cooling pipes are rotatably supported, the cooling water being supplied to the pipes, and the diameter of enveloping circle formed by these curved cooling pipes at a determined horizontal position is varied by relatively rotating the upper and lower ends of support members of pipes.

B. Description of Prior Art

In an inflation method for manufacturing films or bags of thermoelastic resin, a bubble which is inflated in a cylindrical form with air or water must be rapidly cooled and then taken up by a roll. An outline of inflation molding is given with reference to FIG. 1. Thermoelastic resin pellet thrown into an extruder 12 from a hopper 10 is heat melted and extruded by the extruder and, passed through a circular die 14 and inflated by a compressed air, becomes a cylindrical film, in other word, a bubble 16. The surface of bubble 16 is cooled by water or air cooling means 18 and put between and made narrower by stabilizing plates 20 and nip rollers 22, is taken up by rollers (not shown), thus becomes flat film or bag. The reason for utilizing water or air cooling means 18 in inflation method is, although different according to the kinds of resins, to hasten a molding speed, to increase transparency of bubble 16 and to add the intensity of bubble 16. (For example, in case of linear low density polyethylene, such cooling means is utilized in order to obtain high transparency. In case of polypropylene, for obtaining high transparency as well as increased intensity.) In these cooling means, air cooling means have defects that the transparency of bubble can not be increased, as the bubble is cooled only gradually (For example, double staged air cooling means must be employed.). In addition, the bubble is vibrated by air flow, therefore, such air cooling means are not within the scope of the present invention. On the other hand, the babble is rapidly cooled near its frost line by the water cooling means which directly contacts with the bubble. Accordingly, the water cooling means are advantageous that the transparency of bubble can by far be increased by hastening its crystallization.

In the Japanese published patent specification No. 46-37111, prior art water cooling means are disclosed, as shown in FIG. 2. The water cooling means comprise a plurality of semi-circular or horseshoe-shaped pipes 24 by which are formed an annular water cooling ring whose inner diameter can be varied. But, the inner diameter of the combined water ring can not be varied uniformly with regard to its radius direction, accordingly, many kinds of rings must be prepared for attending the change of bubble size. The unevenness of thickness of bubble is caused due to the irregularity of cooling effect, as the contact position of rings to bubble lacks uniformity. Further, scratches to the bubble is caused, as the passing bubble is caught by the ring. In conclusion, the prior art water cooling means are not adequate for cooling the bubble uniformly.

SUMMARY OF THE INVENTION

Accordingly, it is a primary object of the present invention to provide variable-type bubble water cooling apparatus which can fully attend the change of bubble size by freely varying the inner diameter of bubble passing portion.

Other object of the present invention is to provide variable-type bubble water cooling apparatus by which whole circumference of bubble can uniformly be cooled so as to prevent unevenness of bubble thickness.

Further object of the present invention is to provide variable-type bubble water cooling apparatus which comes smoothly in contact with the bubble without causing any scratch to it.

It is some other object of the present invention to provide variable-type bubble water cooling apparatus which is utilized for upward as well as downward inflation molding process.

To achieve these objects, the upper and lower ends of numbers of curved cooling pipes are rotatably supported in the variable-type bubble water cooling apparatus according to the present invention, the cooling water being supplied to the pipes, and the diameter of enveloping circle formed by these curved cooling pipes at a determined horizontal position is varied by relatively rotating the upper and lower support members of pipes.

These and further objects of the present invention will be more clearly understood by the following descriptions with reference to the attached drawings. But, these are only examples of the invention and the present invention shall not be limited to those examples.

DETAILED DESCRIPTION OF PREFERRED EMBODIMENT

Figure 1:
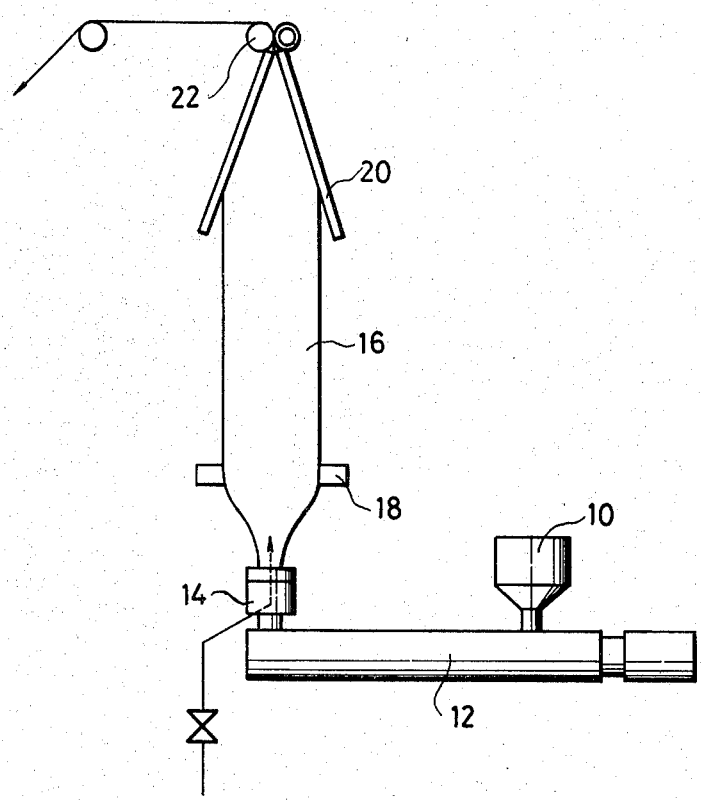
FIG. 1 is a schematic illustration for giving an explanation on manufacturing of film by inflation method.
Figure 2:
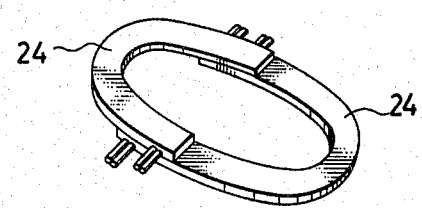
FIG. 2 is a perspective view showing a prior art.
Figure 3:
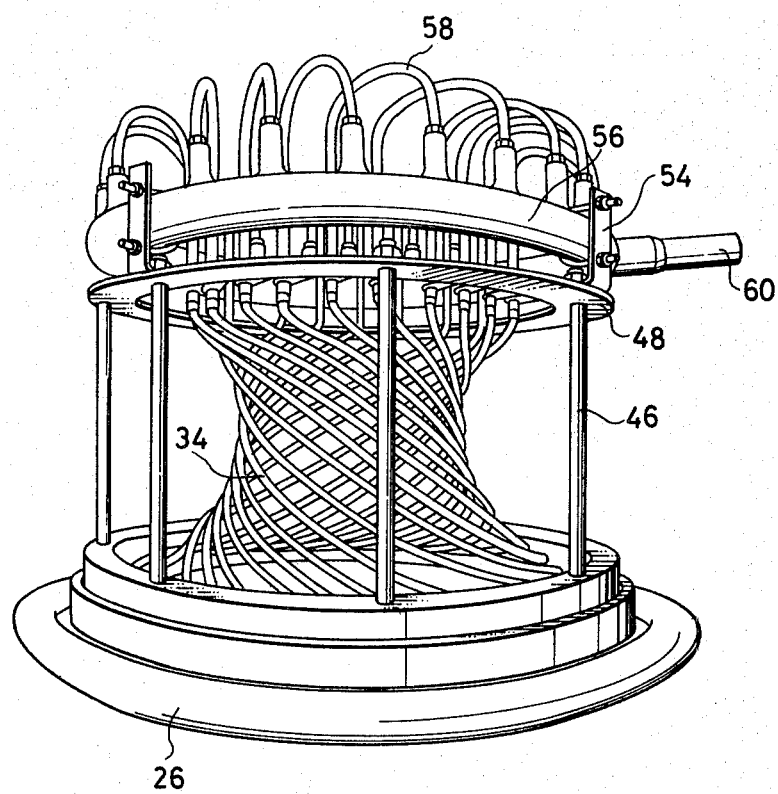
FIG. 3 is a total perspective view showing a variable-type bubble water cooling apparatus according to an embodiment of the present invention.

A preferred embodiment of the present invention will be detailed hereinunder with reference to the attached drawings.

At the lower portion of the apparatus provided an annular water supply pipe 26 to which cooling water is fed from a water inlet 28. The water supply pipe 26 is a force member whose cross section is circular or polygonal and a lower support ring 30 is united in a body to the inside of the water supply pipe 26. At the equally divided position of the circumference of plate-like lower support ring 30 bored through many fitting holes to which the lower ends of curved cooling pipes 34 are rotatably attached by way of a slide member. The curved cooling pipes 34 are in communication with the water supply pipes 26 via flexible synthetic resin tubes 36. A plurality of pole members 38 are erected at the lower support ring 30. A roller 40 is attached to the upper end of pole member 38. The roller 40 engages with a groove 44 at the periphery of lower rotation ring 42 which can be rotated in relation to the lower support ring 30. Many other modifications are possible with regard to the rotation mechanism of the lower rotation ring 42, for example, the lower rotation ring 42 may be mounted on the lower support ring 30 by way of roller bearings.

The shape of lower rotation ring 42 is, likewise the lower support ring 30, annular, but the inner diameter of lower rotation ring 42 is somewhat smaller than that of lower support ring 30. A plurality of support poles 46 are at suitable intervals erected on the upper surface of the ring 42 and an upper rotation ring 48 is mounted on the upper end of the support poles 46.

The upper rotation ring 48 is opposed to the lower rotation ring 42 by a plurality of support poles 46 as described. Pins 50 are positioned at equally divided portion of upper rotation ring 48 and one end of link 52 is movably joined to the pin 50. Other end of link 52 holds the upper end of the curved pipe 34. Accordingly, the upper ends of the curved cooling pipes 34 are rotatably attached to the upper rotation ring 48 by these link means.

A concentrated exit pipe 56 is united with the upper rotation ring 48 by a plurality of joints 54. The exit pipe 56 may well be fixed to the circumference of upper rotation ring 48 just like the water supply pipe 26. Each upper ends of curved cooling pipes 34 are communicated with the concentrated exit pipe 56 by way of flexible tubes 58 such as synthetic resin tubes. Thereby, the cooling water fed from the curved cooling pipes 34 are discharged from an outlet 60 of the concentrated exit pipe 56. The discharged cooling water may well be chilled by a chiller (not shown) and the chilled water may be re-used by returning it to the water inlet 28 by a pump.

Figure 4:
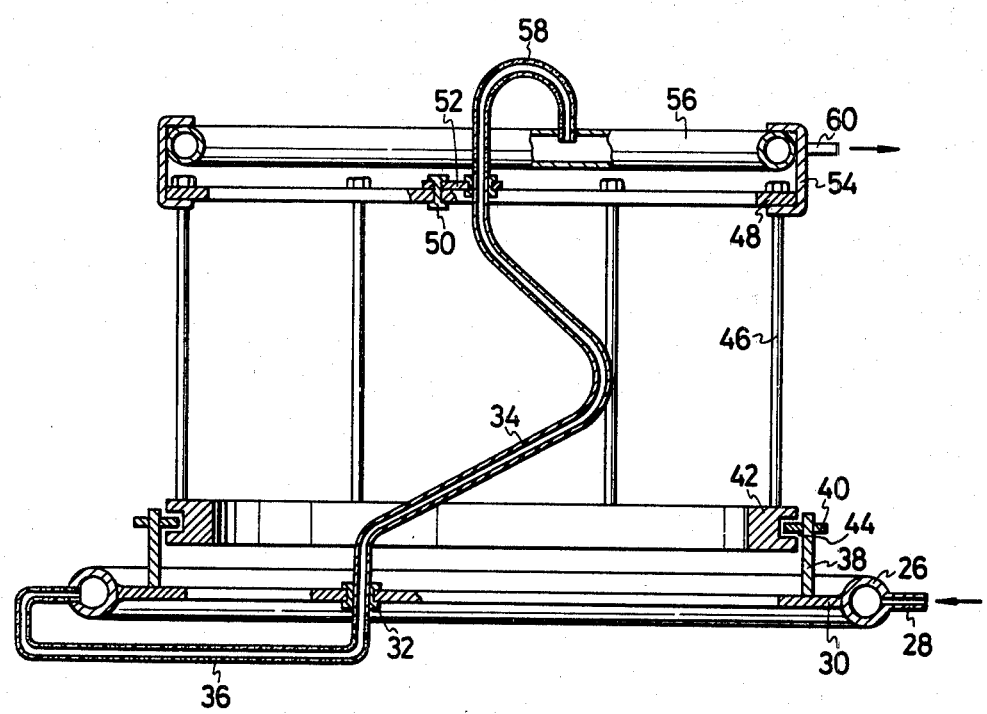
FIG. 4 is a cross-sectional view of the apparatus of FIG. 3, especially showing a curved cooling pipe.
Figure 5:
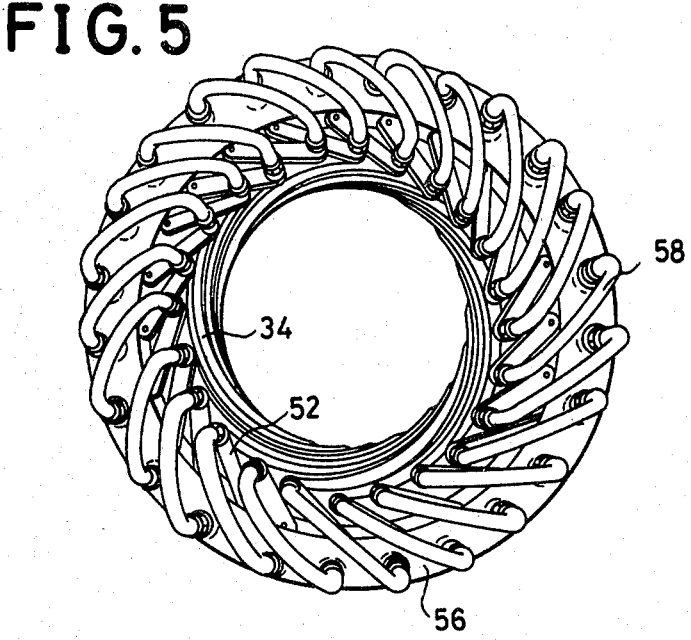
FIGS. 5 and 6 are plan views showing an action of the apparatus.
Figure 6:
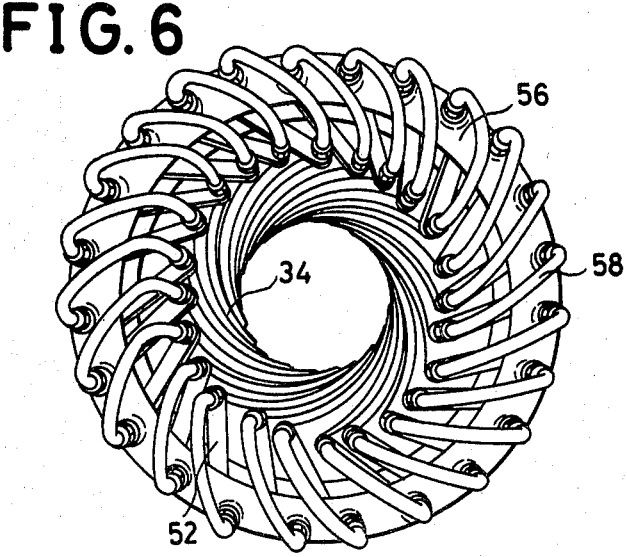

In FIG. 4, one among the many curved cooling pipes 34 is typically depicted. The curved cooling pipe 34 is a metal pipe such as a copper which is curved in a definite shape. Copper pipe is chosen because it is excellent in its shapeability and heat-conductivity and, moreover, the friction resistance of the copper pipe to a bubble is few. Polytetrafluoro-ethylene resin may well be added to the maximum curvature portion which directly contacts with the bubble. The lower end of the curved cooling pipe 34 is in communication with the water supply pipe 26 by way of a tube 36, being rotatably supported to the lower support ring 30 as described before. Whereas the upper end of it is in communication with the water exit pipe 56 by way of flexible tube 58, being rotatably supported by the upper rotation ring 48 via a link and so forth. As will be understood from FIG. 5 and so forth, the upper end support position of curved cooling pipe 34 by the upper rotation ring 48 differs with the lower end support position by lower support ring 30 with regard to the circumferential position. At the middle position of the upper and lower rotation rings 48, 42, the curvature of many curved cooling pipes 34 varies at its maximum. The maximum curvature portion of many cooling pipes 34 can be uniformly arranged at a determined horizontal position by cutting the pipes 34 in equal length, shaping them by a mold and supporting the upper and lower ends of them as described. As shown in FIG. 5 and so forth, the enveloping circle formed by peripheries of many curved cooling pipes 34 is almost true circle with regard to the center of the apparatus where the bubble passes through. The diameter of the enveloping circle can be varied by the relative rotation of lower and upper support rings 30, 48. The lower support ring 30 to which the concentrated water supply pipe 26 is united is rotatably engaged with the upper rotation ring 48 to which the concentrated exit pipe 56 is combined. When the lower rotation ring 42 which moves in a body with the upper rotation ring 48 is rotated with regard to the center of the apparatus by a combination of motor and gear or a chain and sprocket (not shown), a plane position of upper rotation ring 48 which holds upper ends of cooling pipes 34 by way of link means approaches to or separates from that of lower support ring 30 by which lower ends of cooling pipes 34 are rotatably supported. Thereby, the diameter of the enveloping circle formed by many curved cooling pipes 34 is, as shown in FIGS. 5 and 6, enlarged or reduced. The diameter of the enveloping circle can be maintained by stopping the before-said motor or chain and the bubble which perpendicularly passes through in contact with the enveloping circle can be effectively cooled at constant diameter. As described, variable type bubble water cooling apparatus according to the present invention comprises, basically, numbers of curved cooling pipes and, by relatively rotating the upper and lower ends of the pipes, the diameter of the enveloping circle is varied.

Thus, as the diameter of bubble passing portion of the apparatus can freely be varied, bubbles of variety of seizes can be produced by a single apparatus. Also, as the apparatus is totally symmetrical with regard to the center of the enveloping circle, the pipes come uniformly in contact with the circumference of the bubble at the same horizontal position, the cooling effects and positions are constant and the produced bubble has no unevenness of its thickness. Further, as the bubble contacts with the periphery of pipe, excellent quality of bubble without any scratch can be produced. The transparency of bubble which is rapidly cooled by the apparatus according to the present invention is stricking.

Many other applications and modifications are possible in relation to the present invention. The present invention is not limited to those shown and described hitherto.

What is claimed is:

1. Variable-type bubble water cooling apparatus in an apparatus for producing cylindrical film of thermoelastic resin comprising;

an annular water supply pipe, a lower support ring which is attached to the water supply pipe and rotatably supports the lower ends of many curved cooling pipes, an annular lower rotation ring which is rotatable in relation to the lower support ring, an upper rotation ring which is opposed to the lower rotation ring in spaced relationship and rotatably supports the upper ends of many curved cooling pipes by way of numbers of link means, a concentrated exit pipe which is united with the upper rotation ring and to which the upper ends of many curved cooling pipes are communicated by way of flexible pipes, numbers of curved cooling pipes of metal in which passes through the cooling water, the lower ends of them being rotatably supported by the lower support ring and communicated with the concentrated water supply pipe, the upper ends of them being rotatably supported by the upper rotation ring by way of link means and communicated with the concentrated exit pipe, so that the enveloping circle formed by peripheries of many curved cooling pipes at a determined horizontal position approximately in the middle of upper and lower rotation rings are almost true circle with regard to the center of apparatus, the diameter of enveloping circle being varied by relative rotation of lower and upper support rings, and the bubble which contacts and passes through the enveloping circle perpendicularly is cooled at a determined diameter of the circle.

* * * * *